United States Patent [19]  [11] 3,878,041
Leitnaker et al. [45] Apr. 15, 1975

[54] OXYNITRIDE FUEL KERNEL FOR GAS-COOLED REACTOR FUEL PARTICLES

[75] Inventors: James M. Leitnaker, Kingston; Terrence B. Lindemer, Oak Ridge, both of Tenn.

[73] Assignee: The United States of America as represented by the Administrator of the Energy Research and Development Administration, Washington, D.C.

[22] Filed: Aug. 8, 1973

[21] Appl. No.: 386,657

[52] U.S. Cl. .............. 176/67; 176/82; 176/91 SP; 252/301.1 R; 264/0.5
[51] Int. Cl. .......................... G21c 3/06; C21c 3/20
[58] Field of Search .... 176/67, 82, 89, 91 R, 91 SP, 176/90; 252/301.1 R; 264/0.5

[56] References Cited
UNITED STATES PATENTS

| 3,230,177 | 1/1966 | Blum et al. | 252/301.1 R |
| 3,361,638 | 1/1968 | Bokros et al. | 176/91 R |
| 3,746,616 | 7/1973 | Leitnaker et al. | 252/301.1 R |
| 3,798,123 | 3/1974 | Lindemer | 176/67 |

Primary Examiner—Benjamin A. Borchelt
Assistant Examiner—C. T. Jordan
Attorney, Agent, or Firm—John A. Horan; David S. Zachry; John B. Hardaway

[57] ABSTRACT

A new nuclear fuel for use in gas-cooled reactors comprising a carbon coated kernal of $UO_{2-x}N_{3/4\,x}$ where $0 < x \leq 1$.

6 Claims, 2 Drawing Figures

OXYNITRIDE FUEL KERNEL FOR GAS-COOLED REACTOR FUEL PARTICLES

BACKGROUND OF THE INVENTION

This invention was made in the course of, or under, a contract with the United States Atomic Energy Commission. It relates generally to a new fuel for use in gas-cooled reactors.

As is disclosed in commonly assigned copending application Ser. No. 235,206 filed Mar. 16, 1972, now U.S. Pat. No. 3,798,123, fuel used in gas-cooled nuclear reactors is subject to coating thinning and the amoeba effect due to oxygen released during the fissioning of a $UO_2$ fuel kernel. A typical fuel particle is sectionally shown in FIG. 1 of the drawings. Such a particle comprises an approximately spherical oxide kernel (1), a cover of porous carbon (2), a sealer layer of dense pyrolytic graphite (3), a layer of silicon carbide (4) and a final layer of dense pyrolytic graphite (5). The inner or buffer layer of porous carbon (2) with a porosity about 10 to 70% absorbs any expansion or swelling of the kernel (1) and minimizes damage to the other layers due to fission fragment recoil from the kernel. The adjacent dense graphite layer (3) is applied to isolate the kernel and layer (2) from attack by deleterious gases, such as chlorine, used in depositing the silicon carbide layer (4). The silicon carbide layer (4) gives dimensional stability to the overall fuel particle and provides containment for metallic fission fragments. The silicon carbide layer may be omitted in experimental fuels but is included in all present particles for practical nuclear application.

Failure of the above fuel particle design during operational conditions has been attributed to oxygen release during fissioning so as to produce CO and $CO_2$ by reaction with the carbon buffer layer. This reaction has been observed to cause a thinning of the coatings and in some cases a migration of the kernel out of the coatings. The latter phenomenon is known as the amoeba effect. In either instance, the failure of the particle is attributable to excessive CO and $CO_2$ pressures within the particle as a result of oxygen released during fissioning of the fuel.

SUMMARY OF THE INVENTION

It is thus an object of this invention to provide a new fuel particle for use in gas-cooled reactors.

It is a further object to provide a fuel particle which accommodates oxygen released during fissioning so as to minimize CO and $CO_2$ pressures within the fuel particle.

These, as well as other objects, are accomplished by utilizing a fuel kernel comprising $UO_{2-x}N_{3/4\ x}$ where $0 < x < 1$ within a conventional fuel particle.

DETAILED DESCRIPTION

Figure 1:
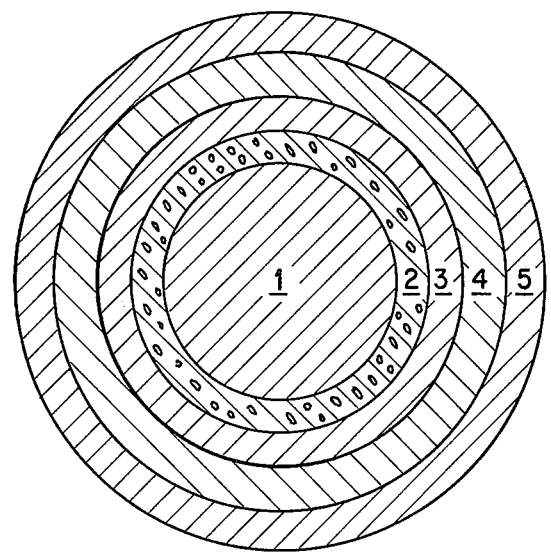
FIG. 1 is a sectional view of a HTGR fuel particle.
Figure 2:
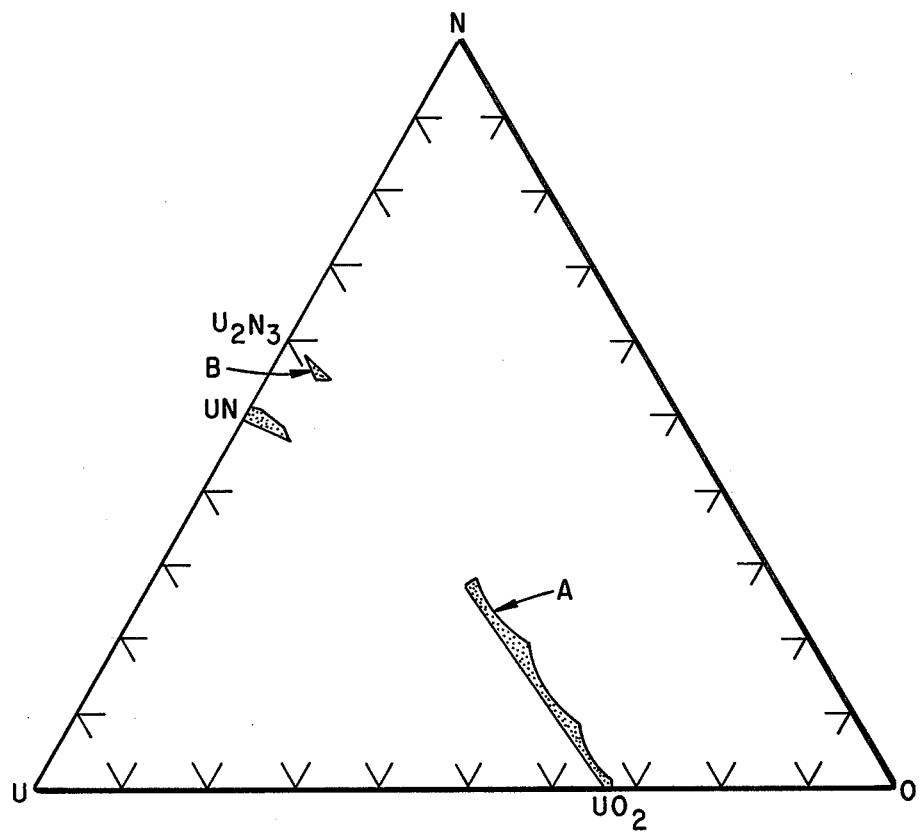
FIG. 2 is a ternary phase diagram of the uranium, oxygen, nitrogen system.

According to this invention, it has been found that $UO_{2-x}N_{3/4\ x}$ where $0 < x < 1$ maintains a low oxygen potential when in contact with carbon so as to essentially eliminate fuel failure due to coating thinning and the amoeba effect. The effective composition according to this invention is shown within the area A of FIG. 2 of the drawings. This is a single phase region which contains no UN. At elevated temperatures, $UO_{2-y}N_{3/4\ y}$ (area B) will form, thus causing the composition in area A to move toward $UO_2$. However, this reaction has no adverse effect on the gas phase equilibria which is of interest to this invention.

In general, the fuel kernel of this invention comprises either a physical mixture of $UO_2$ and $U_2N_3$ or the solid solution formed thereby. Under operational conditions $UO_2$ and $U_2N_3$ will normally not exist individually but will exist as the solid solution $UO_{2-x}N_{3/4\ x}$ which is formed by $$(1 - [x/2])\ UO_2 + (x/4)\ U_2N_3 \xrightarrow{(solution)} UO_{2-x}N_{3/4\ x}.$$

(I)

Either state, however, is effective to establish the desired equilibrium and thus maintain the CO and $CO_2$ pressures at a level below that which will cause fuel failure.

The apparent reason that the fuel of this invention reduces fuel degradation due to the presence of CO and $CO_2$ within the fuel kernel is that oxygen released during fission is accommodated into the U—N—O system by gas-solid equilibrium reactions. Simply stated, this accommodation is expressed by $$[UN_{1.5}] + O_2 \rightleftarrows [UO_2] + \tfrac{3}{4} N_2.$$

(II)

The brackets in the above equation are used for thermodynamic convenience to indicate the presence of the compounds in the single-phase solid solution. In practice, the equilibrium of oxygen with carbon monoxide and carbon is also maintained via the reaction $$2CO \rightleftarrows 2C + O_2$$

(III)

and the addition of these two reactions gives $$[UN]_{1.5} + 2CO \rightleftarrows [UO_2] + 2C + \tfrac{3}{4} N_2$$

(IV)

The latter equation represents equilibrium between all the major solid and gaseous phases present in the fuel particle. The presence of minor amounts of $CO_2$ is established by the equilibrium $$2CO \rightleftarrows CO_2 + C$$

(V)

in which $P_{CO_2}$ is generally $<< P_{CO}$.

In either event the $O_2$, CO and $CO_2$ pressures are maintained at a level at which fuel failure will not result from coating thinning or the amoeba effect. It should be noted that nitrogen is released as a consequence of removing oxygen from the kernel atmosphere; however, nitrogen does not deleteriously affect the carbon coatings.

The selection of the value $x$ in $UO_{2-x}N_{3/4\ x}$ is based on estimates of the chemical behavior of the fuel-fission product system within a coated particle. By considering the release of oxygen from $UO_2$ during fission, a value of $x$ can be preselected so as to accommodate the released oxygen. The oxygen release is not precisely known, but for the present purposes the following expressions encompass the available estimates:

$$C + UO_2 \xrightarrow{fission} 1.03\ M\ O_{1.65} + 0.30\ CO$$
$$C + UO_2 \xrightarrow{fission} 1.07\ M\ O_{1.73} + 0.15\ CO$$
$$C + UO_2 \xrightarrow{fission} 1.10\ M\ O_{1.81} + 0.01\ CO \quad (VI)$$

in which M indicates fission product metal.

By conservation of mass, the following expressions concerning the chemistry of the oxynitride-fission product system during a burnup of F%FIMA (fission per initial heavy metal atom) are obtained.

Initial Condition

The phases present are:
a. 1 mole of $UO_{2-x}N_{3/4\ x}$
b. negligible moles of CO, $CO_2$ or $N_2$ present in the gas phase After Burnup The phases present are:

a. $(1-.01F)$ moles $UO_{2-w}N_{3/4\ w}$ \hfill (VII)

b. $(.01F)$ M/U moles of fission product oxide \hfill (VIII)

c. $\frac{1}{2}[\frac{3}{4}x - \frac{3}{4}w(1-01F)] =$ moles of $N_2$ gas $= N_{N_2}$ \hfill (IX)

d. negligible moles of CO or $CO_2$ gas
e. no solid-phase nitrides

The conservation of mass requires that
(moles of oxygen) initial = (moles of oxygen) after burnup (moles of nitrogen) initial = (moles of nitrogen) after burnup.

Use of these relations to solve for w gives $$w = 2 - [2 - x - (M/U)(O/M)\ (.01F)/(1 - .01F)] \quad (X)$$

in which $M/U$ is the ratio of fission product metal oxide formed per uranium fission, Equation VI, and $O/M$ is the average ratio of oxygen-to-fission product metal in the fission-product oxides, Equation VI.

Equation X can thus be used to calculate the minimum value of $x$ necessary in the original oxynitride fuel. A requirement here is that the value of $w$ after a given final burnup, $F_f$, be no less than zero. Equation X is thus used for $w = 0$ to give $$x_{initial} = 0.01F_f(2 - (M/U)(O/M)) \quad (XI)$$

Typical minimum values of x are given in Table I.

TABLE I

| (M/U) | (O/M) | Typical Minimum Values of x x at F = | | | |
|---|---|---|---|---|---|
| (Eq. VI) | | 25 | 50 | 75 | 100(theoretical) |
| 1.03 | 1.65 | 0.075 | 0.15 | 0.225 | 0.30 |
| 1.07 | 1.73 | 0.0375 | 0.075 | 0.1125 | 0.15 |
| 1.10 | 1.81 | 0.0025 | 0.005 | 0.0075 | 0.01 |

The maximum initial value of $x$ should be about three times the minimum allowable value to compensate for any errors in the estimation of the chemical behavior of the system. From Table I, the maximum value of $x$ can be calculated to be 0.9.

The fuel particle of this invention may be produced by either forming microspheres of a mixture of $UO_2$ or $U_2N_3$ with about 0.01 to 5.2 weight percent of $U_2N_3$ or preferably by forming the solid solution from previously formed $UO_2$ microspheres.

The solid solution is best formed by reacting $UO_2$ microspheres with nitrogen to form $UO_{2-x}N_{3/4\ x}$. This is done by placing $UO_2$ in a bed of carbon and heating in the presence of $N_2$ and CO. Since $x$ moles of oxygen are removed from the $UO_2$ to form $UO_{2-x}N_{3/4\ x}$, it follows that at least $x$ moles of carbon must be present to remove the oxygen as CO. Table II lists fabrication conditions which can be used to produce the fuel of this invention with the desired value of $x$.

TABLE II

| Range of x in $UO_{2-x}N_{3/4\ x}$ | Exact x | T °C | $P_{CO}$ Torr | $P_{N_2}$ Torr |
|---|---|---|---|---|
| 0 – 0.10 | 0.035 | 1842 | 520 | 19 |
| | 0.094 | 1700 | 300 | 100 |
| | 0.072 | 1700 | 160 | 19 |
| | 0.027 | 1538 | 38 | 19 |
| | 0.041 | 1540 | 38 | 100 |
| | 0.059 | 1529 | 100 | 380 |
| | 0.020 | 1244 | 2 | 380 |
| | 0.051 | 1250 | 2 | 600 |
| 0.1 – 0.2 | 0.11 | 1847 | 520 | 65 |
| | 0.13 | 1850 | 520 | 190 |
| | 0.15 | 1694 | 160 | 100 |
| | 0.11 | 1250 | 1.0 | 380 |
| | 0.19 | 1400 | 12 | 600 |
| | 0.14 | 1350 | 6.9 | 600 |
| 0.2 – 0.3 | 0.23 | 1700 | 300 | 380 |
| | 0.24 | 1537 | 38 | 380 |
| | 0.28 | 1450 | 20 | 600 |
| 0.3 – 0.4 | 0.35 | 1697 | 160 | 380 |
| | 0.32 | 1525 | 52 | 600 |
| | 0.40 | 1500 | 33 | 600 |
| >0.4 | 0.50 | 1555 | 38 | 700 |
| | 0.52 | 1550 | 52 | 600 |

Preparation of the $UO_{2-x}N_{3/4\ x}$ is typically accomplished by a variation of the process disclosed in U. S. Pat. No. 3,510,434. Microspheres of $UO_2$ prepared by a conventional method such as the sol-gel technique are used as feed material. These microspheres may have an O/U ratio of exactly two or they may be hyperstoichiometric ($O/U = 2 + y$) or hypostoichiometric ($O/U = 2 - y$) in oxygen. The microspheres are mixed with carbon or graphite particles, the amount being at least $[(2 \pm y) - (2-x)]$ moles of graphite per mole of $UO_{2 \pm y}$. The carbon particles are conveniently a mesh size that is smaller than the $UO_2$ so that excess carbon may be removed after heat treatment by a screening process. Excess carbon may be added to the system and, in fact, this is desirable in order to maximize the $UO_2$-carbon contact during the heat treatment; such close proximity is necessary so that oxygen removed from the $UO_2$ can react immediately with the carbon to form CO.

The $UO_2$-carbon mixture is placed in a graphite, tungsten, or molybdenum vessel and is placed in a furnace. A gas mixture containing CO and $N_2$ at the desired partial pressures (Table I) is flowed through the furnace at a given temperature (Table I) and at a rate that insures that approximately ten volumes of CO and $N_2$ are swept past the $UO_2$-carbon charge for each volume of CO removed from the $UO_2$. For example, if one mole of $UO_{1.6}N_{0.3}$ were produced, then 0.4 mole of CO is released, or 8.96 liters of CO at STP. Thus, about 90 liters (STP) of CO + $N_2$) should be flowed past the charge during the heat treatment. This is done to insure that the $CO/N_2$ ratio remains at the value necessary to give the desired value of $x$. Other gases may also be added to the CO and $N_2$ gases; argon is conveniently added to provide a total gas pressure of one atmosphere. Hydrogen additions in the amount of 1–8 volume percent are also beneficial because this procedure is generally known to enhance the gas-phase transport of nitrogen, carbon and/or oxygen between the $UO_2$ and carbon.

The time necessary for the processing is about one hour at 1,700°C and about 10 hours at 1,200°C for 1,000 micrometer $UO_2$ microspheres. The time is independent of the amount of $UO_2$ charged.

After the desired reaction time, the charge should be cooled to ambient temperature as rapidly as is practicable (e.g., furnace turned off) to minimize changes in $x$ during cooling. Removing the crucible and charge from the hot zone of the furnace is even more desirable. The gas flow can then be stopped. After the charge is at ambient temperature the excess carbon particles can be removed by screening.

Many variations of the above process are possible. For example, resin-derived microspheres may be used with excess carbon in the microspheres providing the necessary carbon content. The reaction may also be carried out in a fluidized bed.

Coating layers may be applied by conventional techniques. The initial low density, highly porous carbon coating may be applied, for example, using the method disclosed in U. S. Pat. No. 3,472,677. A high density coating may then be applied using the method disclosed in U. S. Pat. No. 3,471,314. A SiC layer, if desired, may be applied in a fluidized bed with the SiC being derived by the thermal decomposition of, for example, methyl trichlorosilane. The outer carbon layer may be produced by again using the process of U. S. Pat. No. 3,471,314.

EXAMPLE

The pressure of carbon monoxide ($P_{CO}$) in a pure $UO_2$ HTGR particle can be obtained from an adaptation of the ideal gas law in which $$P_{CO} = .01 N_{CO} RT F/a\theta, \quad (XII)$$

where
- $a$ = ratio, void volume in kernel and buffer layer/superficial volume of kernel
- $\theta$ = molar volume of $UO_2$
- $R$ = 82.06 cm³-atm/mole °K
- $T$ = temperature, °K
- $F$ = percent FIMA
- $N_{CO}$ = moles of carbon monoxide in Equation (VI).

This equation was used to calculate the values of $P_{CO}$ in Table III as a function of burnup at 1,800°K with a typical value of $a = 2.5$. As a comparison, the values of $P_{CO}$ and $P_{N_2}$ in the fuel particle of this invention are included. The pressure of $N_2$ during burnup is calculated from the moles of nitrogen released, which is obtained from relations (IX) and (X). This is $$P_{N_2} = 0.00375 F (x_{initial}) RT/a\theta \quad (XIII)$$

The $P_{CO}$ during burnup is calculated from the relation for the equilibrium constant of reaction (IV); this is approximately $$P_{CO} = P_{CO_{initial}} \frac{P_{N_2}}{P_{N_{2\,initial}}} \quad (XIV)$$

in which the pressures are in atmospheres and $P_{N_2}$ is obtained from Equation (XIII). For example, in Table II at 1,555°C = 1,828°K, $x = 0.5$ at $P_{CO\,initial} = 0.05$ atmosphere and $P_{N_2\,initial} = 0.92$ atmosphere.

TABLE III

Gas Pressures During Burnup of $UO_2$ At Approximately 1800°K and a = 2.5

| % FIMA | $P_{Xe} + P_{Kr}$ Atm. | Fully-enriched $235_{UO2}$ $P_{CO}$ Atm. | $UO_{2-x}N_{3/4x}$ $x = 0.5$ $P_{CO}$ Atm. | $P_{N_2}$ Atm. |
|---|---|---|---|---|
| 25 | 180 | 6 – 180 | 0.30 | 114 |
| 50 | 360 | 12 – 360 | 0.40 | 228 |
| 75 | 540 | 18 – 540 | 0.46 | 343 |

As is seen from the above example, the fuel particle of this invention provides a superior advance over the prior art $UO_2$ fuel particles in that the $P_{CO}$ is greatly reduced, thus minimizing fuel failure due to coating thinning and the amoeba effect.

While this invention has been explained with reference to $UO_2$ and $U_2N_3$, it is equally applicable to mixed oxide-nitride systems in the U-Pu, U-Th, and Th systems.

What is claimed is:

1. A high temperature gas-cooled reactor fuel particle comprising a spheroidal kernel of a metal oxide and a metal nitride with up to 33-⅓ mole percent nitride, said oxide and nitride being selected from the group consisting of a mixture of $UO_2$ and $U_2N_3$, a mixture of $(U,Pu)O_2$ and $U_2N_3$, a mixture of $ThO_2$ and $Th_2N_3$, and a carbon cover adjacent said kernel.

2. The particle of claim 1 wherein said oxide and nitride are $UO_2$ and $U_2N_3$.

3. The particle according to claim 2 wherein said $UO_2$ and $U_2N_3$ are present as a solid solution $UO_{2-x}N_{3/4}$ $x$ wherein $0 < x < 1$.

4. The particle according to claim 2 wherein said $UO_2$ and $U_2N_3$ are within the area A of FIG. 2.

5. The particle according to claim 2 wherein said $U_2N_3$ is present in an amount of from 0.06 to 22-½ mole percent.

6. The particle according to claim 2 further comprising a dense graphite layer adjacent said carbon cover, a SiC layer adjacent said graphite layer and a second dense graphite layer adjacent said SiC layer.

* * * * *